(12) United States Patent
Warbus et al.

(10) Patent No.: US 6,501,929 B1
(45) Date of Patent: Dec. 31, 2002

(54) PRINTING SYSTEM FOR PRINTING A RECORDING MEDIUM USING TWO PRINTERS, AND A METHOD FOR OPERATING SUCH A PRINTING SYSTEM

(75) Inventors: Volker Warbus, Oberhaching (DE); Heinz Böck, Taufkirchen (DE); Holger Hofmann, München (DE); Bernd Hausmann, Olching (DE); Herbert Gibisch, München (DE); Wolfram Keil, Poing (DE); Anton Stürzer, Grafing (DE); Ulrich Bäumler, Poing (DE)

(73) Assignee: Océ Printing Systems GmbH, Poing (DE)

( * ) Notice: Subject to any disclaimer, the term of this patent is extended or adjusted under 35 U.S.C. 154(b) by 0 days.

(21) Appl. No.: 09/762,889

(22) PCT Filed: Aug. 13, 1999

(86) PCT No.: PCT/EP99/05940

§ 371 (c)(1),
(2), (4) Date: Apr. 16, 2001

(87) PCT Pub. No.: WO00/10121

PCT Pub. Date: Feb. 24, 2000

(30) Foreign Application Priority Data

Aug. 13, 1998 (DE) .......................... 198 36 744

(51) Int. Cl.$^7$ .................. G03G 15/22; G03G 15/00
(52) U.S. Cl. .................. 399/130; 358/1.15; 399/9

(58) Field of Search .................. 399/130, 1, 2, 399/9, 77, 15, 14; 358/1.15, 1.16, 1.17

(56) References Cited

U.S. PATENT DOCUMENTS

| | | | |
|---|---|---|---|
| 5,208,640 A | | 5/1993 | Horie et al. |
| 5,253,028 A | * | 10/1993 | Gonda et al. ............... 399/130 |
| 5,526,107 A | | 6/1996 | Bronstein |
| 5,548,390 A | | 8/1996 | Sugisaki et al. |
| 5,859,711 A | * | 1/1999 | Barry et al. ............... 358/1.15 |

FOREIGN PATENT DOCUMENTS

| | | |
|---|---|---|
| DE | 195 00 169 A1 | 7/1995 |
| EP | 0 154 695 | 9/1985 |
| WO | WO 97/46393 | 12/1997 |

* cited by examiner

*Primary Examiner*—Susan S. Y. Lee
(74) *Attorney, Agent, or Firm*—Schiff Hardin & Waite

(57) ABSTRACT

A printing system for printing on recording media first by a first printer and then by a second printer provides that print data is supplied in a page by page manner to the first and second printers from a print data source. Page information is sent to the printers using the print data and corresponding page information is sent to a buffer storage by the first printer. The page information in the buffer storage and the page information sent to the second printer are verified in a page by page manner by determining adherence to a predetermined rule. A synchronization mark is generated on the recording media by the first printer and is read by the second printer, which is used to control the printing process.

16 Claims, 2 Drawing Sheets

PRINTING SYSTEM FOR PRINTING A RECORDING MEDIUM USING TWO PRINTERS, AND A METHOD FOR OPERATING SUCH A PRINTING SYSTEM

BACKGROUND OF THE INVENTION

1. Field of the Invention

The present invention is directed to a printing system, whereby a recording medium is printed first by a first printer and then by a second printer, and is also directed to a method for printing with such a printing system.

2. Description of the Related Art

In printing systems of this type, the recording medium is printed by a first printer and is then supplied to a second printer that is of the essentially same type as the first printer. The recording medium can thereby be present in the form of individual sheets or as a web-shaped recording medium. As needed, it can be composed of paper, plastic film material or of other materials as well. Dependent on the embodiment of the printer devices, fanfold material, roll material with margin perforation or roll material without margin perforation can be printed.

European Patent Document EP 154 695 B1 discloses a tandem printing system. For the drive of such a printing system, European Patent Document EP 0 239 845 B1 provides that the main control devices of the two printers be connected, on the one hand, via a host computer on a data control level and, on the other hand, via a second connection on a device control level.

Margin-perforated, web-shaped paper is often employed as a recording medium in electrographic high-performance printers having printer performances of more than 40 pages per minute. This paper has lateral holes at its longitudinal edge sides for the margin transport and for monitoring the position of the paper. It is thereby transported with caterpullars that engage into the lateral transport holes of the paper. The margin perforation is used for the drive control, particularly when processing pre-printed paper. Given such applications, the information applied in the electrographic printer should be fitted into the pre-print as exactly as possible. For such positionally exact printing, the position of the paper in transport direction must exactly adjusted to or, respectively, synchronized with the drive thereof or, respectively, the movement of the photoconductor drum employed for the recording.

Pre-printed paper is also present in the second printer of a tandem printing system when the paper is printed by the first printer and subsequently supplied to the second printer. This, for example, can be the case when the first printer prints in a first color and the second printer prints on the same page in a second color.

German Patent Document DE-A-195 00 169 A discloses a method for the control of the printing process in a tandem printing system, whereby continuous stock for the double-sided printing is first supplied to the first printer and printed thereat on one side, and, finally, the paper web is supplied to the second printer for printing the back side. Even-numbered pages are thereby printed by the first printer and odd-numbered pages by the second printer.

U.S. Pat. No. 5,526,107 discloses a color printer device wherein the various color separations are printed in different printer units that follow one another in the paper transport path. The printing events of the respectively following printer units are thereby controlled with marks in order to achieve an exactly registered printing.

U.S. Pat. No. 5,208,640 discloses a system wherein print data for a plurality of laser printers are synchronized. Print data are deposited in a FIFO memory and in turn fetched therefrom. However, no teaching can be found in this document that one of the printers provides the other with control data.

SUMMARY OF THE INVENTION

In a tandem printing system, an object of the invention is to assure the correct allocation of the printed pages printed on the recording medium by the two printers with optimally high dependability.

This object is achieved by the method for printing in a printing system, whereby a recording medium is printed first by a first printer and then by a second printer, including: a synchronization procedure is implemented at the beginning of the printing event, whereby both printers are matched to one another upon employment of a synchronization mark applied on the recording medium; the print data are supplied page-by-page from a print data source to the first and to the second printer; information about the page numbers are communicated to the printers together with the respective print data; the first printer deposits at least an information about the page number of a page printed by it into a buffer memory during the course of its printing event; and a checking step is carried out page-by-page to see whether the information communicated to the second printer from the print data source and the information stored in the buffer memory conform to a rule predetermined dependent on the printing mode; and whereby, given a positive check result, the second printer implements the printing event and, given a negative check result, an error is reported.

The object of the invention is also met by a printing system, whereby a recording medium is printed first by a first printer and then by a second printer, including: a synchronization procedure is implemented at the beginning of the printing event, whereby both printers are matched to one another upon employment of a synchronization mark applied on the recording medium; print data are supplied page-by-page from a print data source to the first and to the second printer; information about the page numbers are communicated to the printers together with the respective print data; whereby the first printer deposits at least an information about the page number of a page printed by it into a buffer memory during the course of its printing event; and a comparison unit is provided that checks page-by-page to see whether the information communicated to the second printer from the print data source and the information stored in the buffer memory conform to a rule predetermined dependent on the printing mode; and whereby given a positive check result, the second printer implements the printing event and, given a negative check result, an error is reported. Advantageous embodiments of the invention are further provided by the method wherein the step of checking of the two information ensues at a point in time that is defined such by the feed of the recording medium that the print data are reproduced page-exactly on the recording medium. In a preferred embodiment, the method provides for utilizing a FIFO memory as a buffer memory. The length of the FIFO memory corresponds to the number of pages of the recording medium present between the printers, and the readout of the FIFO memory is controlled by the feed of the recording medium carrier. The check is implemented in the second printer. As a further aspect, the page information together with a communication protocol is communicated from the device controller of the first printer to the device controller of the second printer. In the method, a synchronization mark is generated on the recording medium by the first printer for the positionally exact registration of the print image, the synchronization mark being read by a sensor arrangement in the second printer, whereby the sensor signal is employed for the positionally exact printing in the second printer. The synchronization mark is, for example, printed onto the recording medium as an optical mark.

In the preferred printing system, the recording medium is web-shaped. The buffer memory may be a FIFO memory. The comparison unit may be connected at least to a drive control of the second printer so that the point in time of the check for the two page information can be controlled dependent on the feed of the recording medium. The synchronization mark is generated on the recording medium by the first printer for the positionally exact registration of the print image, and a sensor arrangement that reads the synchronization mark is provided in the second printer, and the sensor signal thereby generated is supplied to the device controller of the second printer for the control of the printing event in the second printer. Preferably, exactly one synchronization mark is printed per print job, and the synchronization mark precedes the first printed page of the print job. More specifically, a plurality of synchronization marks are printed onto the recording medium per print job. The synchronization mark may be a component part of a bar code.

Inventively, the print data from a print data source are respectively supplied to the first and to the second printer page-by-page. The page data can thereby be respectively supplied to the first and to the second printer in alternation or by color separations, for example the allocated color page (of, for example, the color black) to the first printer in what is referred to as a highlight color mode and, correspondingly, the allocated print data (of, for example, the color blue) to the other printer. Correspondingly, a front side allocation and back side allocation can be defined for a duplex print, for example that the first printer prints onto the front side of the recording medium and the second onto the back side. Respective page information data are communicated from the print data source to the two printers together with the respective print data. During the course of its printing event, the first printer deposits the page information data or another page information generated by it into a buffer memory. At a predetermined point in time—particularly as soon as the page printed by the first printer pends for printing in the second printer—, a check is then carried out to see whether the page information communicated to the second printer from the print data source corresponds to the page information of a predetermined rule stored in the buffer memory. The content of the rule is dependent on the printing mode that, for example, can be simplex, duplex or highlight color. It can be selected at the tandem printing system or can already be contained in the print data.

What this form of synchronization monitoring achieves is that the print data that were transferred onto the recording medium in the first printer agrees page-exactly with the print data that were transferred onto the recording medium in the second printer. The rule employed in the comparison can thereby be adapted without further ado to the respective print data or, respectively, to the respective printing mode. For example, whether print data of different colors are present for the two printers (highlight color mode) or whether, in a duplex mode, printing should be carried out on the front side in the first printer and on the back side of the same sheet in the second printer can already be stored at the identifier information in the print data.

One advantage of the invention particularly derives when the printing system is restarted following a stop. The page information stored in the inventive memory are thereby preserved and can be reemployed when the printing system is restarted, so that a re-synchronization of the two printers is no longer necessary in many instances.

In one embodiment of the invention, for example, a page number is checked as page information. In particular, a check can be carried out in a highlight color printing mode as to whether the page number stored by the first printer agrees with the current page number of the second printer and—in the duplex printing mode—whether the page number in the second printer is one higher or lower compared to the page number from the buffer memory. A page number as a result of the print job, i.e. as a result of the print data received from the printing system and prescribed by these, or some other page number, for example generated arbitrarily consecutively and internally in the printing system, can be employed as page number.

The invention achieves an electronic page-by-page synchronization monitoring for the two printers that requires no optical marks on the recording medium. It can nonetheless be advantageous to print one or more synchronization pages upon initial commissioning or before a print job, whereby physical marks are generated on the recording medium, for example optical marks are printed onto the paper. Such synchronization pages serve the purpose of adjusting the first data page to be printed by the second printer with high precision relative to the first printed page of the first printer. To this end, it can be advantageous to provide an optical sensor in the second printer, whereby an assignment of numbers can also be advantageous here. For example, it can be achieved by an encoding with bar codes. The first printer then sends the second printer an information for the synchronization in an electronic way. When the second printer has read the anticipated mark with the optoelectronic sensor, then the printing system has been synchronized or, respectively, adjusted with millimeter precision. On the basis of the mark position, the second printer now recognizes where the first data page begins. The synchronization pages can be separated out by post-processing devices that follow the second printer.

A page information or, respectively, mark number of each data page is employed in the inventive, electronic page-by-page synchronization. The first printer thereby initiates the generation and/or intermediate storing of the page information in a memory in the first or second printer. In particular, the memory can be a first-in-first-out register memory (FIFO). As soon as the second printer receives the print data intended for it together with the corresponding page numbers from the print data source, i.e. from the host computer or print server, the page number or, respectively, page marking is compared to the page information deposited in the memory by the first printer. When this comparison conforms to a predetermined rule belonging to the current printing mode, then the printing event is implemented in the second printer. When, in contrast, departures from the rule derive in the comparison, the printing process is stopped and an error is reported.

With the invention, in particular, it is possible to use the entire width of the recording medium for printing paper without margin perforation without having to print optical marks thereon. Further, the synchronization becomes significantly more dependable as a result of the invention because potential read errors of optical marks in the ongoing synchronism monitoring can no longer occur. This is especially advantageous in high-performance printing systems wherein a faulty synchronization is only noticed later under certain circumstances, and a device outage leads to a considerable disturbance in the overall printing or, respectively, production sequence.

For defining the point in time of the comparison, it is especially advantageous to place the drive of the recording medium in the first and/or in the second printer into an interactive connection with the comparison element. In particular, this can ensue with a shared clock generator in a clock-controlled electronic printing system. It is also advantageous to communicate the page information from the first printer to the second printer together with a communication protocol. The control dependability is enhanced further as a result thereof.

It is provided in a further aspect of the invention that the first printer prints a synchronization mark on the recording medium, and that this synchronization mark is read by a sensor in the second printer and employed for the control of the printing event thereat. A high-precision allocation of the print images effected on the recording medium by the two printers can be therewith achieved.

BRIEF DESCRIPTION OF THE DRAWINGS

Exemplary embodiments of the invention are explained in greater detail below on the basis of some Figures.

DETAILED DESCRIPTION OF THE PREFERRED EMBODIMENTS

Figure 1:
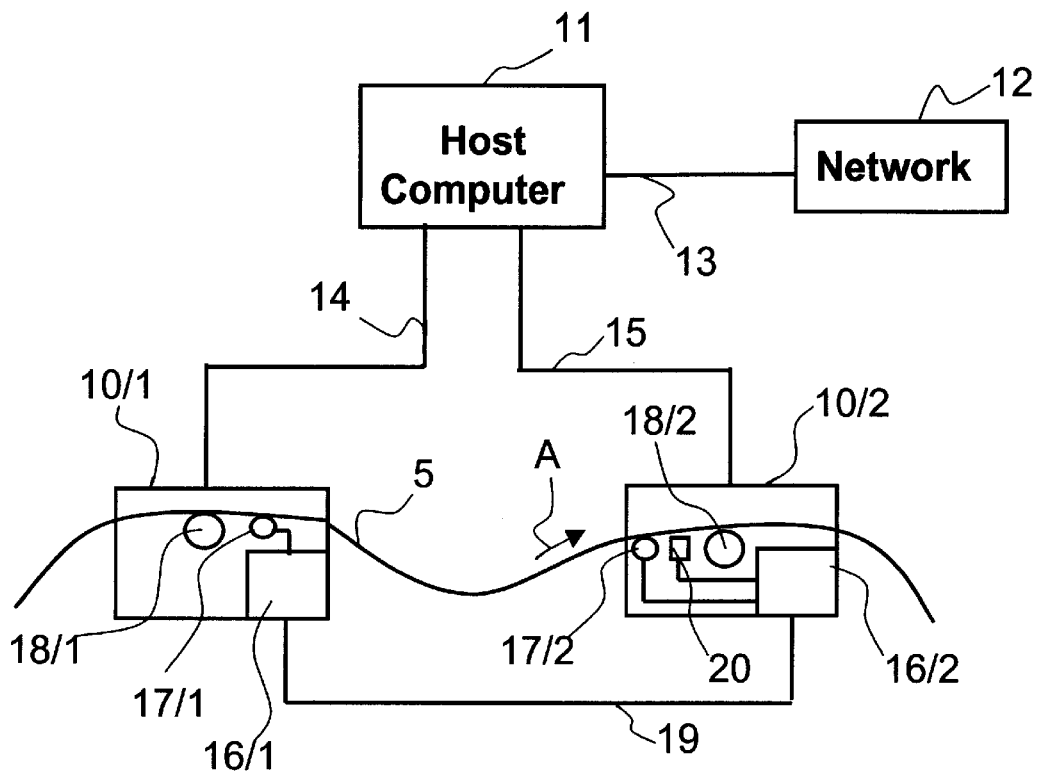
FIG. 1 is a functional block diagram showing a printing system with two printers.

FIG. 1 shows a printing system, whereby a web-shaped recording medium of paper without margin perforations is printed first by a first printer 10/1 and is supplied therefrom along a transport direction A to a second printer 10/2 for printing. Via a network 12, the print data are supplied to a host computer 11 via a data line 13, the host computer 11 acting as a print server. The incoming print jobs are edited in the print server so that they can be supplied with page precision in both printers 10/1 and 10/2. For example, it can be provided for the page division that the printer 10/1 prints all odd-numbered pages of the print job, whereas printer 10/2 prints all even-numbered pages of the print job. In order to effect a duplex printing, the paper web is turned over between these two printers 10/1 and 10/2. However, it can also be provided that the print data of a page that is to be printed in black are printed with the printer 10/1, whereas the print data of the respectively same page that are printed in a different color (for example, red or blue) in the printer 10/2.

The print data are supplied to the first printer 10/1 from the host computer 11 via a data line 14 and are supplied to the printer 10/2 via a data line 15. A device controller 16/1 in the first printer 10/1 processes these data and supplies them to a transfer printing station 18/1 that, in a way known in and of itself, contains a photoelectric drum, an illumination unit as well as a developer station for applying toner. After the transfer printing of the data onto the paper web 5, the image generated thereat is fixed in a way known in and of itself, and the paper web is output from the printer 10/1. In addition to encompassing the data control level, the controller 16/1 of the printer also encompasses a device control level on which internal units like the drive control 17/1 of the printer are driven. Moreover, the first controller 16/1 is connected via a device control line 19 to the corresponding controller 16/2 of the second printer 10/2. The drives 17/1 of the first printer 10/1 and 17/2 of the second printer are synchronized via the device control line 19. As a result thereof, a positionally exact coincidence of the print in the first printer 10/1 and in the second printer 10/2 can be produced on the paper web 5. An optical sensor with which optical marks, the synchronization lines, bar codes, specific alphanumerical characters or the like that the first printer 10/1 generates on the paper web 5 and that are read by the mark sensor 20 serves for the synchronization.

A possible executive sequence of such a synchronization is described in greater detail later on the basis of FIG. 3.

Figure 2:
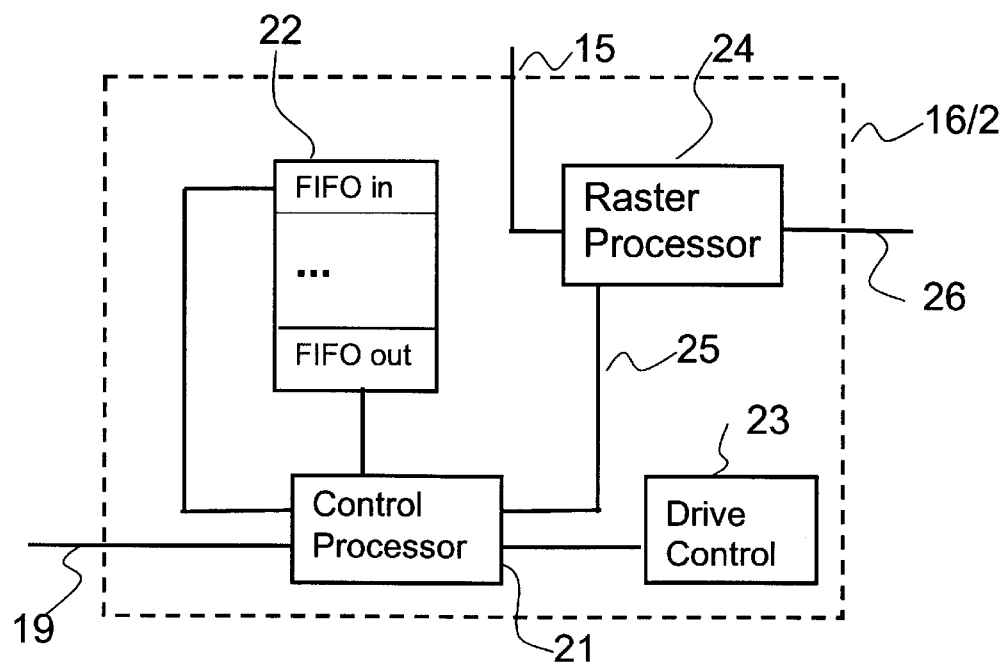
FIG. 2 is a block diagram of component parts of a device controller.

FIG. 2 shows details of the second device controller 16/2. The print data proceed from the host computer to a raster processor 24 (SRA). These information contain a page information that allocates the respective print data to an exact page of the print data stream. The page information need not necessarily correspond to that page information that is contained in the print data stream itself; on the contrary, the host computer can provide it with an arbitrary, internal numbering or, respectively, a corresponding code. The raster processor 24 conducts these page information to a device control processor 21 via the control line 25. On the other hand, the device control processor 21 continuously receives corresponding page information from the printer controller 16/1 via the device control line 19 that inform it of which pages have already been printed by the printer 10/1. The device control processor 21 conducts these page information to a first-in-first-out register memory 22 wherein the page information of the first printer 10/1 are intermediately stored.

Proceeding from the stored data about the time delay or, respectively, number of steps required in order to transport the paper web 5 from the first transfer printing zone 18/1 to the second transfer printing zone 18/2, the device control processor 21 fetches the page information from the memory 22 and compares these page data of the first printer 10/1 to the page data in the second printer currently made available by the master processor 24 via line 25. When the two page two conform to the preset rule, for example that—in duplex mode—the printer 10/1 has printed page number 19 and page number 20 is currently pending for printing at the raster processor 24, then the printing in printer 10/2 is enabled, and the raster processor can conduct the data it has rastered to the transfer printing station 18/2 via line 26.

The transmission of the page data between the two printers 10/1 and 10/2 via the line 19 ensues according to a defined data protocol, whereby security mechanisms can be built in so that the communicated page information dependably proceeds into the memory 22. Insofar as the page data between the printer 10/1 and the raster processor 24 do not agree, the device control processor 21 outputs an error message. The printing system can be subsequently stopped. When, for example, the drive control 23 of the second printer or the corresponding drive control of the first printer 10/1 reports a transport error, the device controller 16/1 or 16/2 can likewise react with a stop of the printing system. The page information in the memory 22 and in the raster processor 24 are preserved and can be reemployed upon restart of the printing system, so that a re-synchronization is no longer required in many instances.

Figure 3:
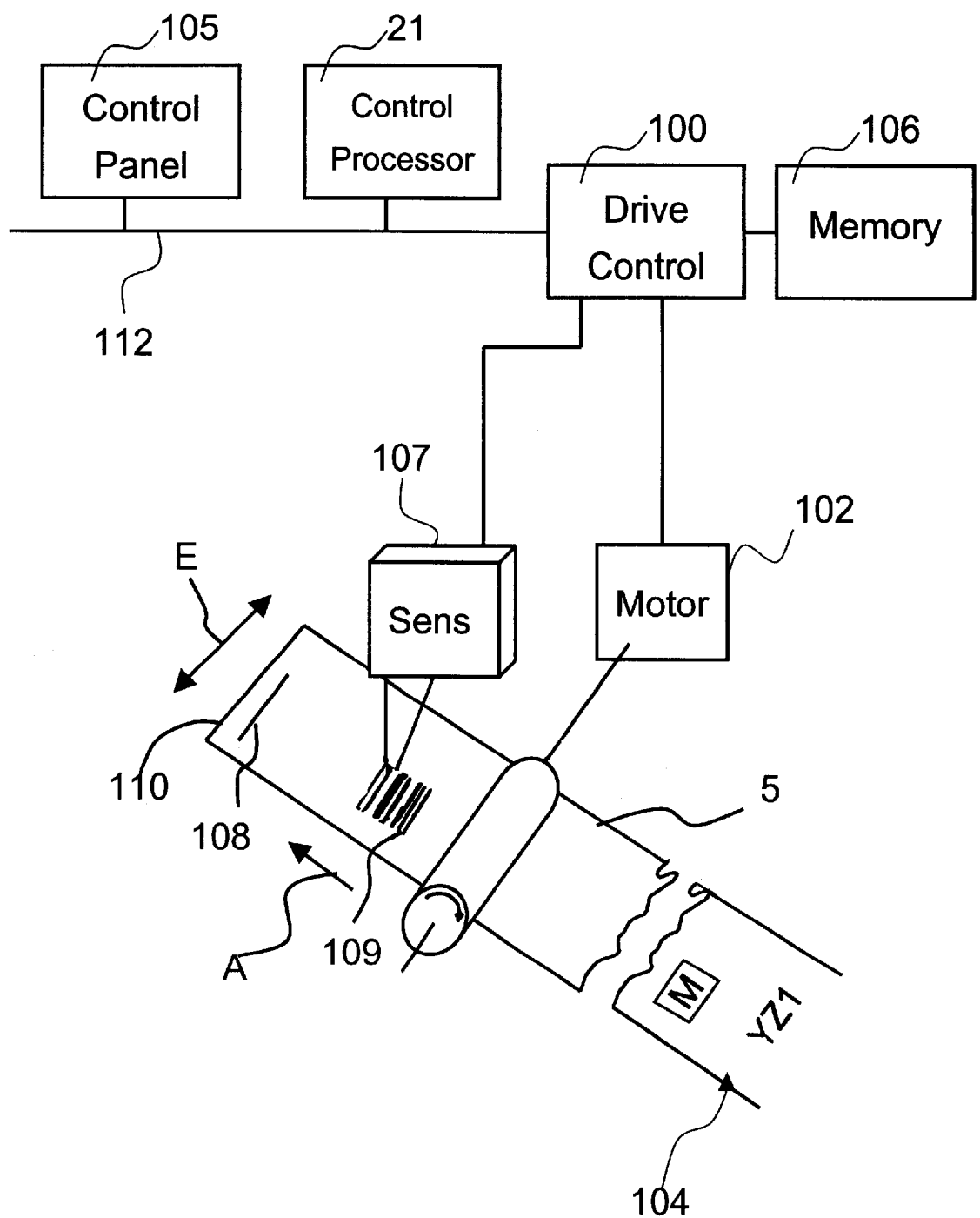
FIG. 3 is a block diagram of executive sequence of a synchronization procedure.

The one-time synchronization procedure with which the two drive controls in the printers 10/1 and 10/2 are matched to one another is now described on the basis of FIG. 3. To this end, FIG. 3 shows the sensor arrangement in the second printer 10/2. The incoming paper web 5 contains a synchronization mark 108 in the form of a black line that proceeds transversely across the page on its first page, what is referred to as the synchronization page. This line was generated by the controller of the first printer 10/1 and printed onto the paper by the first printer 10/1. The drive control 100 of the second printer drives the motor 102 of the second printer 10/2 until the synchronization mark 108 is located in the acquisition region of the optical sensor 20. The electronics 107 thereof recognizes the sensor mark 108 and supplies corresponding synchronization signals to the control processor 21 via the drive control 100. The control processor 21 evaluates the time or, respectively, the number of drive steps of the motor 102 that were required between the printing in the first printer 10/1 and the acquisition of the synchronization mark 108 in the second printer 10/2. These values are stored in a memory 106 of the drive control 100 and are employed later to read out the electronic page information with time or, respectively, step precision. Inputs into and interventions in the system on the part of the user are possible via a control panel 105 that is connected to the other components of the device controller 16/2 via a databus 112.

The synchronization mark 108 and the bar code 109 shown in FIG. 3 are detected with the sens or 20. They are printed by the first printer 10/1 of the printing system only for the purpose of the start synchronization and precede the print data 104 that were communicated to the first printer 10/1 from the host computer 11.

Exemplary embodiments of the invention have been described. It is thereby clear that developments and modifications of the invention can be recited at any time. For example, it can be provided that synchronization information such as thin line bars also be arranged at specific locations (for example, at page transitions) during later printing operation as well, i.e. during the printing of a print job, in order to be able to readjust the fine synchronization of the two drives. Further, the synchronization or bar code information can also be recorded or, respectively, printed by the printer 10/1 between the print data. The position of the optically printed marks such as the synchronization mark or of the bar code can vary dependent on the type of paper or printing mode.

The invention is suitable both for margin perforated paper having sprocket drives as well as for paper without margin perforation that is transported by friction drives. One advantage of the invention is thereby comprised therein that a print no longer need ensue due to the electronic or, respectively, virtual mark on the recording medium. The entire width of the recording medium can thus be employed for presentation of the print image without waste. The invention can be employed both for printing systems with continuous-form paper as well as for single sheet printing systems.

It can be provided in printing systems that print on continuous-form paper to turn the recording medium web over between the two printers, so that a duplex printing is enabled. In this case, it is advantageous to arrange a first sensor in the second printer above the recording medium web for detecting the synchronization marks in the simplex mode and to arrange a second sensor at the underside of the recording medium web for detecting marks printed by the first printer in the duplex mode. It can also be advantageous to arrange the sensor movable transversely to the recording direction along a direction E, as shown in FIG. 3. As a result thereof, the sensor can, in particular, be adapted to different positions of the marks to be detected. This is advantageous when a printing system is provided both for margin-perforated paper as well as for paper without margin perforation.

For fine synchronization or, respectively, for positionally exact allocation of the two print images on a page, finally, it can be provided that both printers print a respective synchronization mark, and that this synchronization mark is sensed following the second transfer printing station in transport direction and is used for the control of the drives.

Instead of the separate optical mark, the beginning or the end of a bar code or a mark that has a different physical constitution such as a punched hole or a notch can also be employed as synchronization mark, assuming the devices required therefor such as punch tools and corresponding reader devices for such marks are provided in the printers.

Although other modifications and changes may be suggested by those skilled in the art, it is the intention of the inventors to embody within the patent warranted hereon all changes and modifications as reasonably and properly come within the scope of their contribution to the art.

What is claimed is:

1. A method for printing in a printing system, in which a recording medium is printed first by a first printer and then by a second printer, comprising the steps of:

implementing a synchronization procedure at a beginning of a printing event, the first and second printers being matched to one another upon employment of a synchronization mark applied on the recording medium;

supplying print data page-by-page from a print data source to the first and to the second printer;

communicating information about page numbers to the first and second printers together with the respective print data;

depositing by the first printer at least information about the page number of a page printed by the first printer into a buffer memory during its printing event; and checking page-by-page to see whether the information communicated to the second printer from the print data source and the information stored in the buffer memory conform to a predetermined rule dependent on the printing mode; and wherein, given a positive check result, implementing by the second printer the printing event and, given a negative check result, reporting an error.

2. A method according to claim 1, wherein said checking step ensues at a point in time that is defined such by feed of the recording medium that the print data are reproduced page-exactly on the recording medium.

3. A method according to claim 2, further comprising the step of: utilizing a FIFO memory as the buffer memory.

4. A method according to claim 3, wherein the FIFO memory is of a length that corresponds to a number of pages of the recording medium present between the first and second printers, and further comprising the step of: controlling readout of the FIFO memory by feed of the recording medium.

5. A method according to claim 1, wherein the checking step is implemented in the second printer.

6. A method according to claim 1, further comprising the step of:

communicating the page information together with a communication protocol from a device controller of the first printer to a device controller of the second printer.

7. A method according to claim 1, further comprising the steps of:

generating a synchronization mark on the recording medium by the first printer for positionally exact registration of the print image, reading said synchronization mark by a sensor arrangement in the second printer, and using a signal from said sensor arrangement for positionally exact printing in the second printer.

8. A method according to claim 7, wherein said step of generating the synchronization mark prints the synchronization mark onto the recording medium as an optical mark.

9. A printing system with which a recording medium is printed, comprising:

a first printer that prints the recording medium first;

a second printer that prints the recording medium second;

a control that implements a synchronization procedure at a beginning of a printing event so that said first and second printers are matched to one another upon employment of a synchronization mark applied on the recording medium;

a print data source from which print data are supplied page-by-page to the first printer and to the second printer;

said control communicating information about page numbers to the first and second printers together with the respective print data;

a buffer memory into which the first printer deposits at least an information about the page number of a page printed by said first printer during its printing event; and a comparison unit that checks page-by-page to see whether information communicated to the second printer from the print data source and the information stored in the buffer memory conform to a predetermined rule dependent on printing mode; and given a positive check result, the second printer implements the printing event and, given a negative check result, an error is reported.

10. A printing system according to claim 9, wherein the recording medium is web-shaped.

11. A printing system according to claim 9, wherein the buffer memory is a FIFO memory.

12. A printing system according to claim 9, further comprising:

a drive control of said second printer to which the comparison unit is connected so that a point in time of the check for the page information can be controlled dependent on feed of the recording medium.

13. A printing system according to claim 9, further comprising:

a synchronization mark generator in said first printer with which a synchronization mark is generated on the recording medium for the positionally exact registration of a print image;

a sensor arrangement in said second printer that reads the synchronization mark; and a device controller of said second printer to which the sensor arrangement is connected to receive a sensor signal for control of the printing event in the second printer.

14. A printing system according to claim 13, wherein said synchronization mark generator generates one synchronization mark per print job, and the synchronization mark precedes a first printed page of the print job.

15. A printing system according to claim 13, wherein said synchronization mark generator generates a plurality of synchronization marks on the recording medium per print job.

16. A printing system according to claim 13, wherein the synchronization mark is a component part of a bar code.

* * * * *